United States Patent
Liu et al.

(10) Patent No.: US 12,009,939 B2
(45) Date of Patent: Jun. 11, 2024

(54) HYBRID AUTOMATIC REPEAT REQUEST PROCESS MANAGEMENT FOR BROADCAST

(71) Applicant: QUALCOMM Incorporated, San Diego, CA (US)

(72) Inventors: Le Liu, San Jose, CA (US); Alberto Rico Alvarino, San Diego, CA (US); Kazuki Takeda, Tokyo (JP); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/649,426

(22) Filed: Jan. 31, 2022

(65) Prior Publication Data

US 2022/0360464 A1    Nov. 10, 2022

Related U.S. Application Data

(60) Provisional application No. 63/201,596, filed on May 5, 2021.

(51) Int. Cl.
  *H04L 12/18* (2006.01)
  *H04L 1/18* (2023.01)
  *H04L 1/1812* (2023.01)
  *H04L 5/00* (2006.01)

(52) U.S. Cl.
  CPC ........ *H04L 12/1868* (2013.01); *H04L 1/1812* (2013.01); *H04L 5/0064* (2013.01)

(58) Field of Classification Search
  None
  See application file for complete search history.

(56) References Cited

U.S. PATENT DOCUMENTS

| | | | |
|---|---|---|---|
| 2019/0342030 A1* | 11/2019 | Hosseini | H04L 1/00 |
| 2020/0084592 A1* | 3/2020 | Gulati | H04W 4/12 |
| 2021/0050956 A1* | 2/2021 | Yeo | H04L 41/0803 |

FOREIGN PATENT DOCUMENTS

EP    3051734 A1 *   8/2016

* cited by examiner

*Primary Examiner* — Yemane Mesfin
*Assistant Examiner* — Jeff Banthrongsack
(74) *Attorney, Agent, or Firm* — Harrity & Harrity, LLP

(57) ABSTRACT

Various aspects of the present disclosure generally relate to wireless communication. In some aspects, a user equipment (UE) may receive one or more repetitions of a broadcast message for broadcast service in one or more transmission occasions. The UE may determine a hybrid automatic repeat request (HARQ) configuration that indicates whether HARQ combining is supported for the broadcast message based at least in part on one or more properties of the broadcast message. The UE may perform a decode attempt on a transport block carried in the one or more repetitions of the broadcast message based at least in part on the HARQ configuration. Numerous other aspects are described.

30 Claims, 9 Drawing Sheets

HYBRID AUTOMATIC REPEAT REQUEST PROCESS MANAGEMENT FOR BROADCAST

CROSS-REFERENCE TO RELATED APPLICATION

This Patent Application claims priority to U.S. Provisional Patent Application No. 63/201,596, filed on May 5, 2021, entitled "HYBRID AUTOMATIC REPEAT REQUEST PROCESS MANAGEMENT FOR BROADCAST," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request (HARQ) process management for broadcast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to: receive one or more repetitions of a broadcast message for broadcast service in one or more transmission occasions; determine a hybrid automatic repeat request (HARQ) configuration that indicates whether HARQ combining is supported for the broadcast message based at least in part on one or more properties of the broadcast message; and perform a decode attempt on a transport block carried in the one or more repetitions of the broadcast message based at least in part on the HARQ configuration.

In some aspects, a method of wireless communication performed by a UE includes receiving one or more repetitions of a broadcast message for broadcast service in one or more transmission occasions; determining a HARQ configuration that indicates whether HARQ combining is supported for the broadcast message based at least in part on one or more properties of the broadcast message; and performing a decode attempt on a transport block carried in the one or more repetitions of the broadcast message based at least in part on the HARQ configuration.

In some aspects, a non-transitory computer-readable medium storing a set of instructions for wireless communication includes one or more instructions that, when executed by one or more processors of a UE, cause the UE to: receive one or more repetitions of a broadcast message for broadcast service in one or more transmission occasions; determine a HARQ configuration that indicates whether HARQ combining is supported for the broadcast message based at least in part on one or more properties of the broadcast message; and perform a decode attempt on a transport block carried in the one or more repetitions of the broadcast message based at least in part on the HARQ configuration.

In some aspects, an apparatus for wireless communication includes means for receiving one or more repetitions of a broadcast message for broadcast service in one or more transmission occasions; means for determining a HARQ configuration that indicates whether HARQ combining is supported for the broadcast message based at least in part on one or more properties of the broadcast message; and means for performing a decode attempt on a transport block carried in the one or more repetitions of the broadcast message based at least in part on the HARQ configuration.

In some aspects, a network node for wireless communication includes a memory; and one or more processors, coupled to the memory, configured to: determine that HARQ combining is supported for a broadcast message based at least in part on one or more properties of the broadcast message; and transmit one or more repetitions of the broadcast message in one or more transmission occasions, wherein the one or more repetitions of the broadcast message are associated with a HARQ process.

In some aspects, a method of wireless communication performed by a network node includes determining that HARQ combining is supported for a broadcast message based at least in part on one or more properties of the broadcast message; and transmitting one or more repetitions of the broadcast message in one or more transmission occasions, wherein the one or more repetitions of the broadcast message are associated with a HARQ process.

In some aspects, a non-transitory computer-readable medium storing a set of instructions for wireless communication includes one or more instructions that, when executed by one or more processors of a network node, cause the network node to: determine that HARQ combining is supported for a broadcast message based at least in part on one or more properties of the broadcast message; and transmit one or more repetitions of the broadcast message in one or more transmission occasions, wherein the one or more repetitions of the broadcast message are associated with a HARQ process.

In some aspects, an apparatus for wireless communication includes means for determining that HARQ combining is supported for a broadcast message based at least in part on one or more properties of the broadcast message; and means for transmitting one or more repetitions of the broadcast message in one or more transmission occasions, wherein the one or more repetitions of the broadcast message are associated with a HARQ process.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
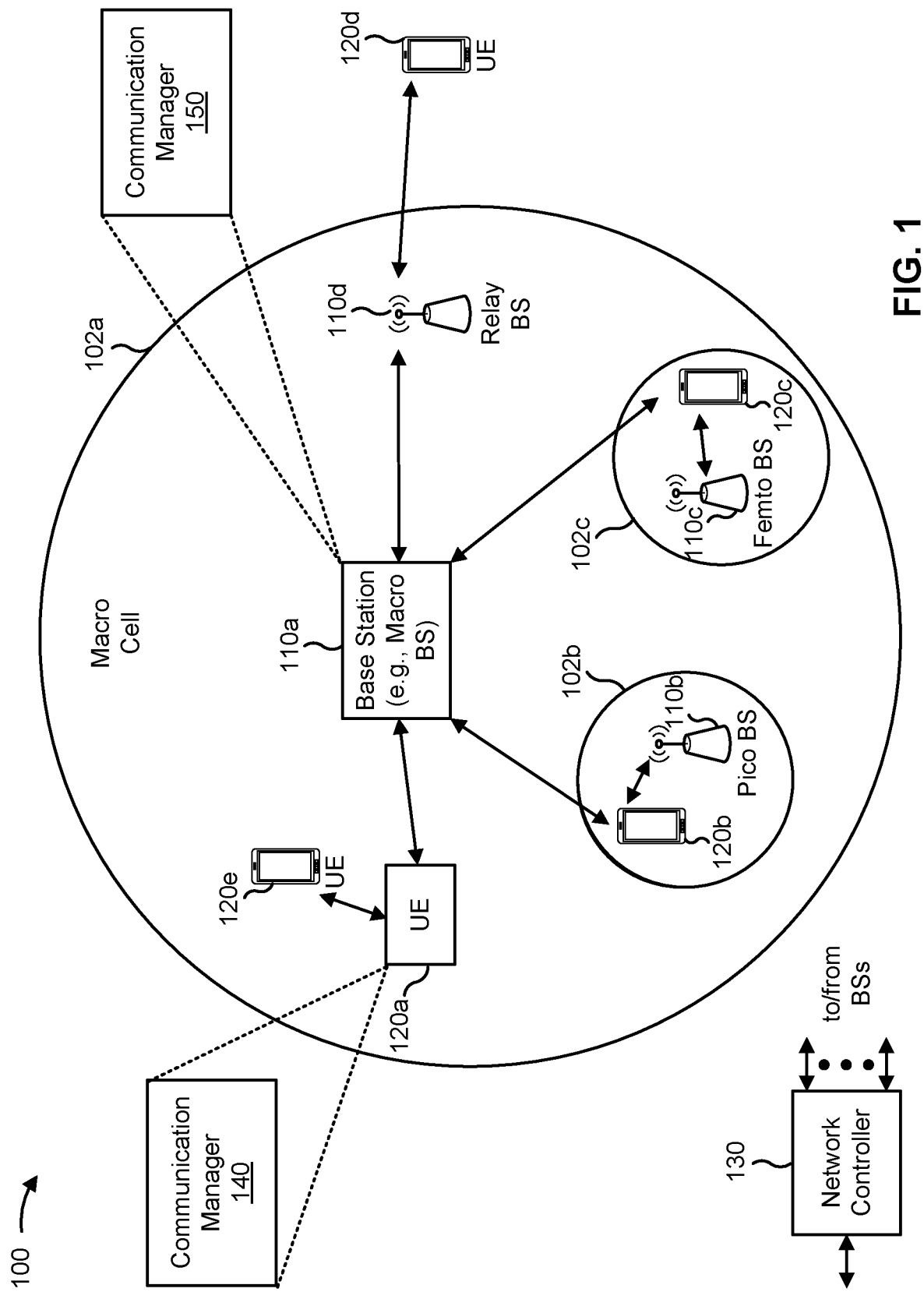
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive one or more repetitions of a broadcast message for broadcast service in one or more transmission occasions; determine a hybrid automatic repeat request (HARQ) configuration that indicates whether HARQ combining is supported for the broadcast message based at least in part on one or more properties of the broadcast message; and perform a decode attempt on a transport block carried in the one or more repetitions of the broadcast message based at least in part on the HARQ configuration. Additionally, or alternatively, the communication manager 140 may perform one or more other operations described herein.

In some aspects, a network node (e.g., a base station 150) may include a communication manager 150. As described in more detail elsewhere herein, the communication manager 150 may determine that HARQ combining is supported for a broadcast message based at least in part on one or more properties of the broadcast message; and transmit one or more repetitions of the broadcast message in one or more transmission occasions, wherein the one or more repetitions of the broadcast message are associated with a HARQ process. Additionally, or alternatively, the communication manager 150 may perform one or more other operations described herein.

As indicated above, FIG. 1 is provided as an example. Other examples may differ from what is described with regard to FIG. 1.

Figure 2:
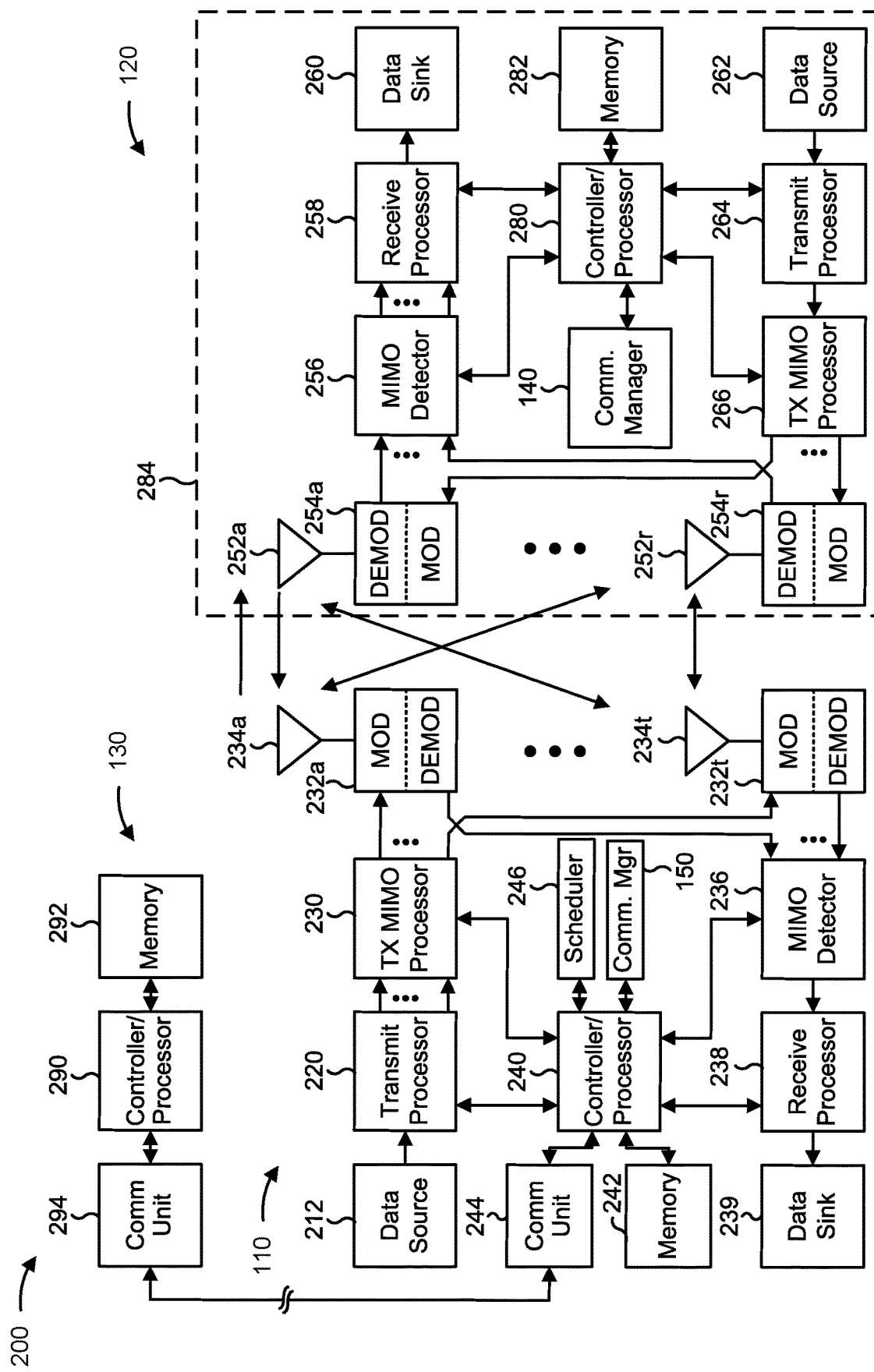
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 5-9).

Controller/processor 240 of base station 110, controller/processor 280 of UE 120, and/or any other component(s) of FIG. 2 may perform one or more techniques associated with hybrid automatic repeat request (HARQ) process management for broadcast, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE 120 includes means for receiving one or more repetitions of a broadcast message for broadcast service in one or more transmission occasions; means for determining a HARQ configuration that indicates whether HARQ combining is supported for the broadcast message based at least in part on one or more properties of the broadcast message; and/or means for performing a decode attempt on a transport block carried in the one or more repetitions of the broadcast message based at least in part on the HARQ configuration. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network node (e.g., the base station 110) includes means for determining that HARQ combining is supported for a broadcast message based at least in part on one or more properties of the broadcast message; and/or means for transmitting one or more repetitions of the broadcast message in one or more transmission occasions, wherein the one or more repetitions of the broadcast message are associated with a HARQ process. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
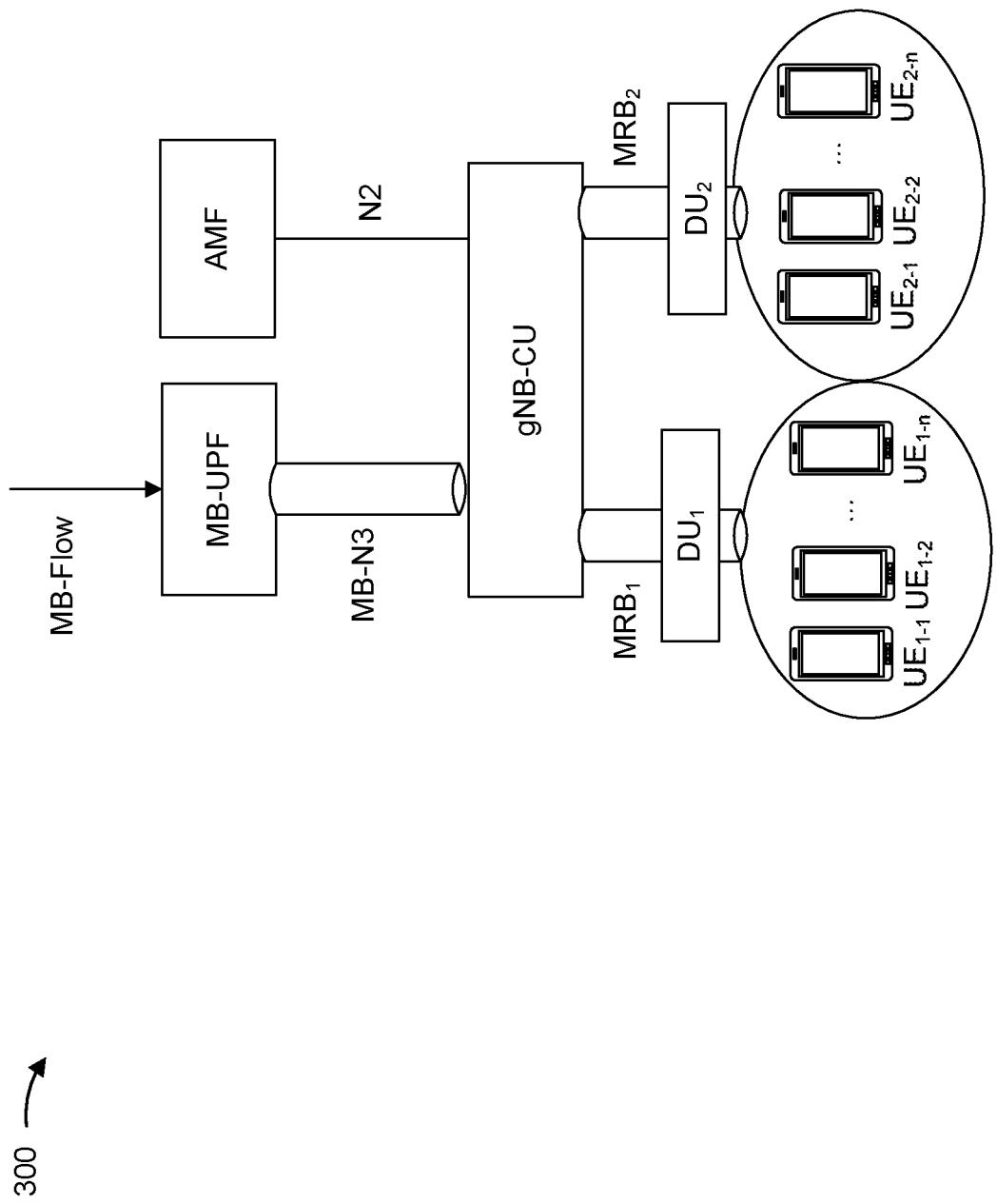
FIG. 3 is a diagram illustrating an example of a multicast broadcast service architecture, in accordance with the present disclosure.

FIG. 3 is a diagram illustrating an example 300 of a multicast broadcast service architecture, in accordance with the present disclosure. In some aspects, the multicast broadcast service architecture may be deployed in a wireless network (e.g., wireless network 100) to support multicast or broadcast services to simultaneously disseminate data, such as emergency alerts or audio or video content, among many other possibilities, to multiple UEs that may be located in the same or different cells. In general, because multicast broadcast operations enable multiple UEs to receive the same data at substantially the same time, multicast operations can significantly reduce network overhead relative to unicast operations in which a particular transmission is received by only one UE.

In an LTE network, multicast broadcast operations may be supported using enhanced multimedia broadcast/multicast service (eMBMS), single-cell point-to-multipoint (SC-PTM) services, multimedia broadcast multicast service over single frequency network (MBSFN), and/or enhanced TV (EnTV), among other examples. For example, in eMBMS, multicast data is transmitted in multiple cells to a group of UEs located in a particular area. In SC-PTM, multicast data is transmitted in a particular cell and the multicast data is received by a group of UEs that are located in the particular cell. In an NR network, a UE may receive multicast broadcast services in mixed mode or broadcast mode. For example, in mixed mode, a UE in a radio resource control (RRC) connected mode may receive multicast broadcast service using a multicast broadcast radio bearer (MRB) or a dedicated radio bearer (DRB). In broadcast mode, a UE may receive multicast broadcast service using an MRB in an RRC connected mode, an RRC idle mode, or an RRC inactive mode.

As shown in FIG. 3, the multicast broadcast service architecture may include a multicast broadcast user plane function (MB-UPF) that receives (e.g., from an application server) a multicast broadcast (MB) flow including content to be multicasted and/or broadcasted. As further shown, the multicast broadcast service architecture may include a centralized base station unit (gNB-CU) that receives the MB flow and a temporary mobile group identity (TMGI) associated with the MB flow from the MB-UPF over an MB-N3 tunnel (e.g., a user plane interface for delivering the MB flow and the corresponding TMGI using a general packet radio service tunneling protocol (GTP)). Furthermore, the gNB-CU may communicate with an access and mobility management function (AMF) that manages UE network registration, manages mobility, maintains non-access stratum (NAS) signaling connections, and/or manages UE registration procedures, among other examples. For example, the gNB-CU may communicate with the AMF over an N2 interface that enables control signaling to establish and/or modify the MB flow and/or the TMGI.

In some aspects, the gNB-CU may map the MB flow received from the MB-UPF to an MRB and/or a DRB based at least in part on the TMGI associated with the MB flow, and the gNB-CU may forward the MB flow to a distributed unit (DU) that may include one or more TRPs, which may multicast or broadcast the content included in the MB flow to one or more UEs via an MRB. Additionally, or alternatively, the DU may transmit the content included in the MB flow to one or more UEs via a DRB. In this way, the multicast broadcast service architecture may flexibly switch between transmitting content to UEs via a DRB (or a unicast bearer) and an MRB, and may provide unicast assistance to the MRB at lower layers to improve reliability and/or reduce service disruption.

As indicated above, FIG. 3 is provided as an example. Other examples may differ from what is described with regard to FIG. 3.

Figure 4:
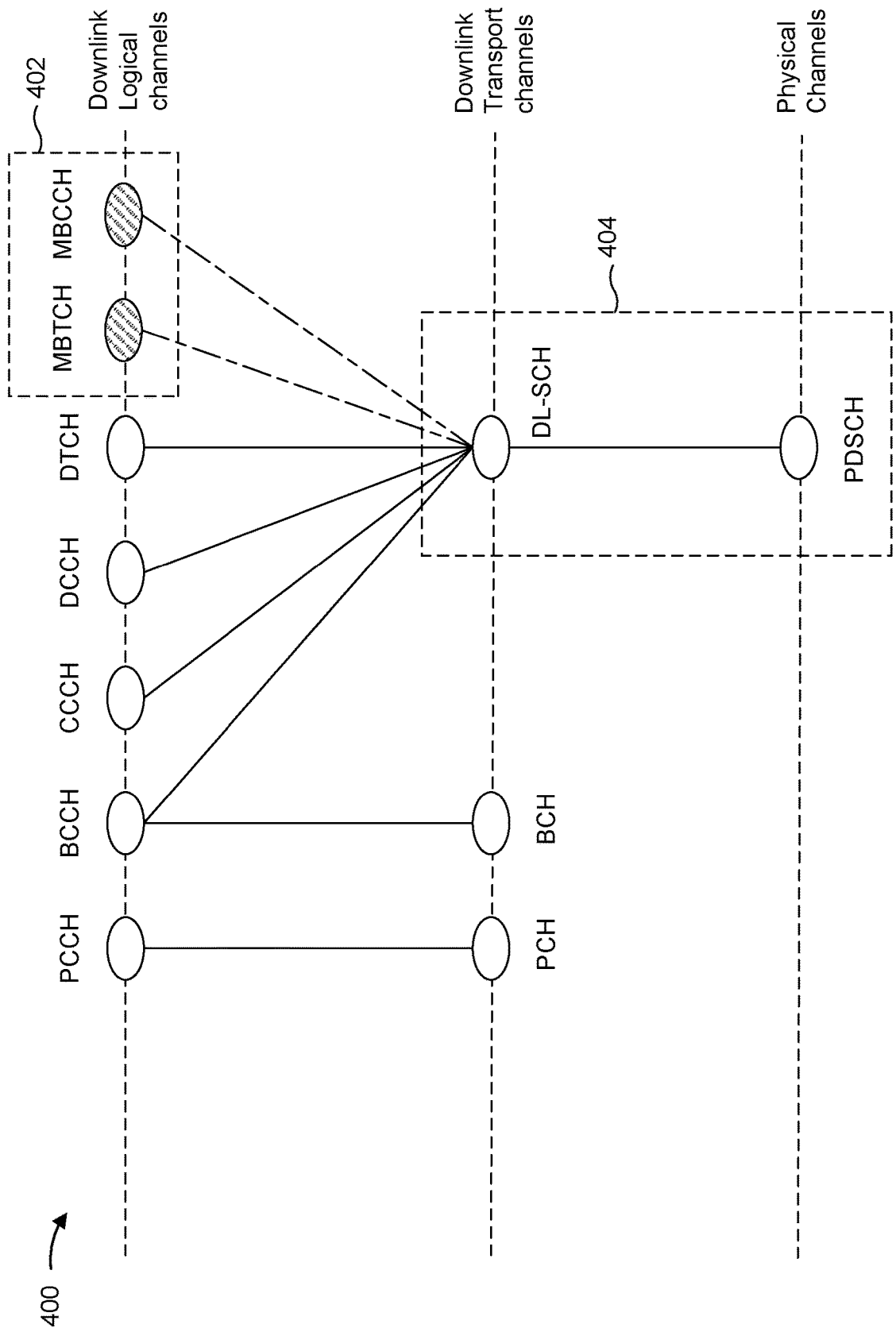
FIG. 4 is a diagram illustrating an example of a channel mapping for multicast broadcast communications, in accordance with the present disclosure.

FIG. 4 is a diagram illustrating an example 400 of a channel mapping for multicast broadcast communications, in accordance with the present disclosure. As shown by reference number 402, multicast or broadcast transmissions in an NR network may be supported using a multicast broadcast traffic channel (MBTCH) and a multicast broadcast control channel (MBCCH). The MBTCH may carry multicast or broadcast data, while the MBCCH may carry configuration information or control information for multicast or broadcast communications to be transmitted on the MBTCH. A multicast or broadcast communication on the MBTCH may be addressed to a group of UEs using a group common radio network temporary identifier (G-RNTI).

In some aspects, different MBTCHs may be used to carry multicast broadcast traffic with different quality of service (QoS) requirements. A multicast broadcast traffic flow with associated QoS requirements or QoS parameters (e.g., a group of related packets for the same multicast broadcast service) may be referred to as an MB-QoS flow. In some aspects, there may be a one-to-one mapping between MB-QoS flows and MBTCHs. A base station or a core network device may configure a multicast broadcast radio bearer (MRB) for an MB-QoS flow. In some aspects, there may be a one-to-one mapping between MB-QoS flows and MRBs. Accordingly, each MBTCH may correspond to an MRB for carrying an MB-QoS flow.

The MBCCH may carry configuration information for configuring the MBTCHs, and may be addressed to all UEs in a cell (e.g., a physical cell or a virtual cell) using a single cell RNTI (SC-RNTI). In some aspects, there may be a single MBCCH per cell (physical cell or virtual cell), and the MBCCH may carry MBTCH configuration information for multiple multicast broadcast services with different MB-QoS flows. As shown by reference number 404, the MBCCH and the MBTCH are logical channels, and may be mapped to a downlink shared channel (DL-SCH) transport channel, which may be mapped to a physical downlink shared channel (PDSCH).

In LTE SC-PTM, a single logical channel identifier is used for both a single cell multicast broadcast control channel (SC-MCCH) that carries multicast broadcast control information and a single cell multicast broadcast traffic channel (SC-MTCH) that carries multicast broadcast traffic.

In LTE broadcast (e.g., LTE SC-PTM, MBSFN, and/or EnTV, among other examples), a radio link control (RLC) unacknowledged mode that does not support any retransmissions is used, and LTE broadcast does not support hybrid automatic repeat request (HARQ) processes to enable HARQ feedback for requesting retransmissions and/or performing HARQ combining (sometimes referred to as soft combining or HARQ with soft combining). For example, in a HARQ protocol, a HARQ process may be associated with a data communication (e.g., a transport block) using a HARQ process. The HARQ process associated with the data communication may be indicated to the UE, such as in a downlink grant or downlink control information (DCI). In cases where HARQ acknowledgement (HARQ-ACK) feedback is supported, the UE may transmit an acknowledgement (ACK) when the transport block is successfully decoded. Otherwise, when the UE experiences an error with reception and/or decoding of the data communication, the UE may transmit a negative acknowledgement (NACK) to request a retransmission. In some cases, a NACK-only HARQ-ACK feedback mode may be used (e.g., for UEs receiving multicast service in an RRC connected state), where a UE does not transmit an ACK and only transmits a NACK when the UE experiences an error with reception and/or decoding of the data communication.

Additionally, or alternatively, in cases where HARQ combining is supported, the UE may store received data (which may include erroneously received data) in a soft buffer, and may associate the HARQ process with the soft buffer. The same HARQ process may be used for one or more retransmissions of the data communication such that the UE can associate data included in the retransmission(s) with the data stored in the soft buffer (e.g., the data from the original communication and/or any prior retransmissions). In this way, the UE may combine the retransmitted data with the buffered data (e.g., using soft combining or another technique to combine data from multiple transmissions, which may include different redundancy versions of the data communication), thereby improving decoding performance.

In cases where HARQ combining is supported, a memory of the UE may include multiple soft buffers that are each associated with a different HARQ process. Accordingly, the number of soft buffers in the memory of the UE may dictate the total number of HARQ processes supported by the UE (e.g., the number of downlink transport blocks the UE can asynchronously handle at one time). For example, in an NR network, HARQ-ACK feedback is supported for UEs receiving unicast service and/or multicast service in an RRC connected state, and unicast and multicast service may share up to sixteen (16) HARQ processes, which correspond to 16 soft buffers that can be used for HARQ combining. Furthermore, in NR, a dedicated HARQ process with a relatively small soft buffer (e.g., relative to the soft buffers available for unicast and multicast service) may be used to support HARQ combining for system information data carried in a system information block (SIB) with different redundancy versions. Although HARQ-ACK feedback may not be desired for broadcast service (e.g., to avoid the signaling overhead that may arise when many UEs transmit ACK/NACK feedback for a transport block carried in a broadcast message disseminated to all UEs in a cell), HARQ combining for broadcast would be useful to improve decoding performance. For example, as described above, HARQ combining may allow a UE to store data associated with an erroneously received transmission in a soft buffer and later combine the erroneously received transmission with one or more retransmissions to obtain a single, combined transmission that is more reliable than its constituents. However, because HARQ process management is generally undefined for broadcast service, a UE may be unable to realize the improved decoding performance for broadcast service.

Some aspects described herein relate to techniques and apparatuses to enable HARQ process management for broadcast service. For example, in some aspects, a UE may receive one or more repetitions of a broadcast message from a base station, and may perform a decode attempt a transport block carried in the broadcast message based on a HARQ configuration that indicates whether HARQ combining is supported for the broadcast message. For example, in some aspects, the UE may perform the decode attempt on each repetition of the broadcast message individually in cases where the HARQ configuration indicates that HARQ combining is unsupported for the broadcast message, or the UE may combine data associated with the repetitions in a soft buffer that is associated with a HARQ process and perform the decode attempt on the data in the soft buffer in cases where the HARQ configuration indicates that HARQ combining is supported for the broadcast message. When HARQ combining is supported for the broadcast message, the HARQ process that is associated with the soft buffer may be a dedicated HARQ process that is used for broadcast service only, a dedicated HARQ process that is shared with a SIB, and/or a HARQ process associated with HARQ combining for unicast or multicast service, which may improve decoding reliability for broadcast messages.

In some aspects, whether HARQ combining can be performed for a broadcast message may be explicitly or implicitly indicated by a DCI message with a cyclic redundancy check (CRC) scrambled by an RNTI associated with the broadcast message. For example, a DCI message with a CRC scrambled by an MCCH RNTI or an MTCH RNTI may indicate a HARQ process ID (HPID), a new data indication (NDI), and a redundancy version (RV) for the repetition. For the same HPID and the same RNTI, the NDI field in the DCI message can be toggled (e.g., changed from a 0 to a 1, or from a 1 to 0) to indicate a new transmission or a retransmission to the UE, and the RV can be used to indicate the encoded redundancy version for a retransmission. If the broadcast message is a retransmission with an indicated RV value, the UE may know whether soft combining can be performed with the previously received data in the soft buffer; otherwise if the broadcast message is a new transmission, the soft buffer can be cleared by deleting previously received data in the buffer. In some cases, the HPID and/or the NDI may not be indicated by the DCI message for the broadcast message. For the HARQ process allocation, in some examples, if broadcast repetitions are configured and only one HARQ process is allocated for soft combining, the HPID may not need to be explicitly indicated in the DCI message. In another example, if broadcast repetitions are configured and different HARQ processes are allocated for different broadcast messages identified by the associated RNTI, the HPID may not need to be explicitly indicated in the DCI and the UE can use the RNTI to differentiate the HARQ processes for soft combining. For new data scheduling, in one example, if a new transmission is only scheduled periodically based on a configured or predefined modification periodicity, the UE can know whether a broadcast message is a new transmission without the NDI indicated in the DCI message. In another example, a new transmission may be scheduled aperiodically and the NDI may be indicated in the DCI message to inform the UE when the broadcast message is a new transmission or a retransmission to perform soft combining. Although the above schemes can be used to indicate the HARQ combining, the UE is generally not required to apply soft combining of a broadcast message. Whether to soft combine different repetitions of a broadcast transmission can be based on UE implementation. Based on the properties of different broadcast messages, such as a broadcast control message carried in an MCCH addressed by an MCCH RNTI, or broadcast data packets carried in an MTCH addressed by different G-RNTIs, the repetition, the HARQ process allocation, and/or the new data transmission to support HARQ combining can be independently configured.

As indicated above, FIG. 4 is provided as an example. Other examples may differ from what is described with regard to FIG. 4.

Figure 5:
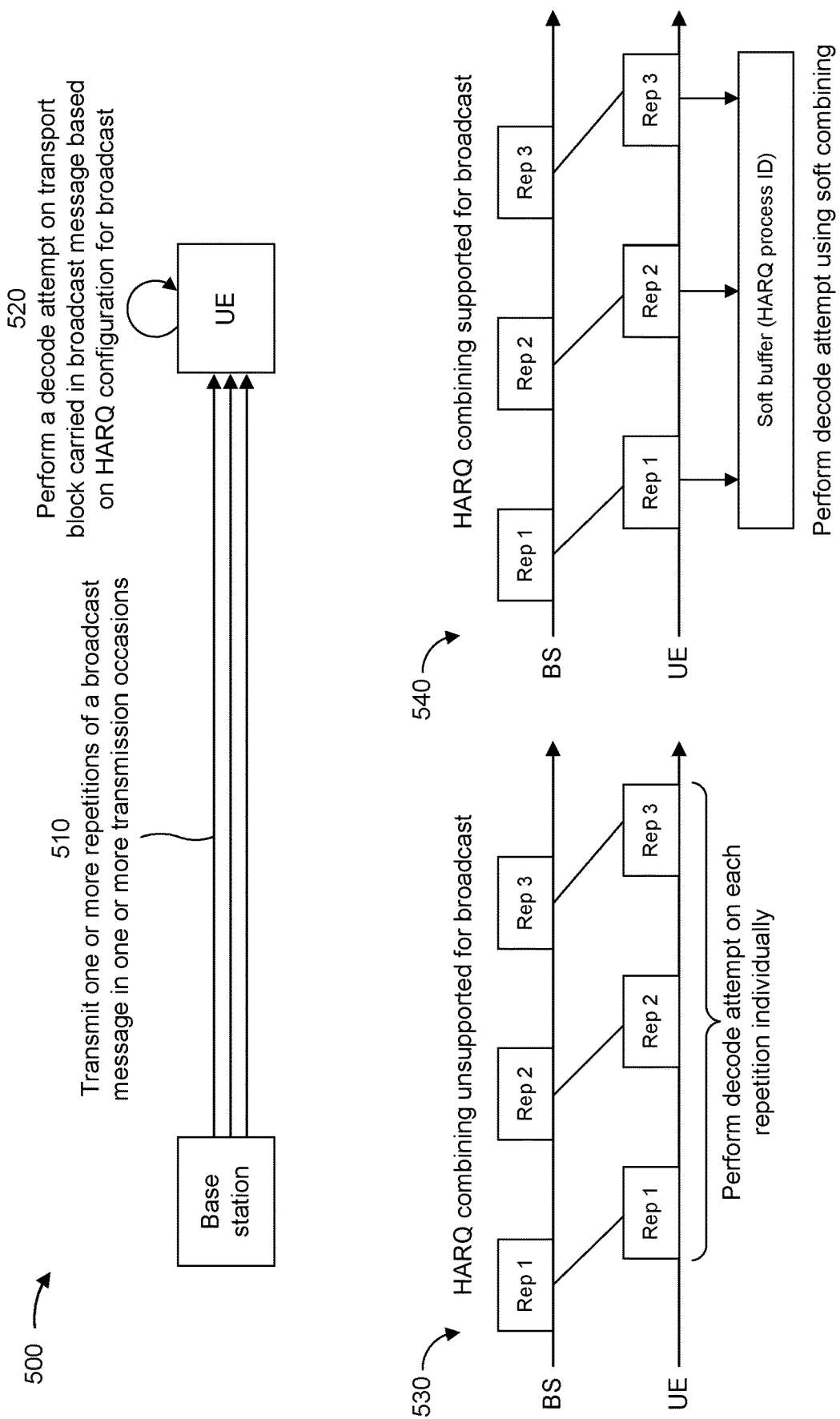
FIG. 5 is a diagram illustrating an example associated with hybrid automatic repeat request (HARQ) process management for broadcast, in accordance with the present disclosure.

FIG. 5 is a diagram illustrating an example 500 associated with HARQ process management for broadcast, in accordance with the present disclosure. As shown in FIG. 5, example 500 includes communication between a base station (e.g., base station 110) and a UE (e.g., UE 120). In some aspects, the base station and the UE may communicate in a wireless network, such as wireless network 100. The base station and the UE may communicate via a wireless access link, which may include an uplink and a downlink. Furthermore, as described herein, the base station and the UE may communicate in a wireless network that supports broadcast service.

As shown in FIG. 5, and by reference number 510, the base station may transmit, and the UE may receive, one or more repetitions of a broadcast message (e.g., one or more repetitions that carry the same transport block). For example, in some aspects, the one or more repetitions of the broadcast message may be addressed to a group of UEs using a group common radio network temporary identifier (G-RNTI), and the broadcast message with repetitions may be scheduled by a group common physical downlink control channel (GC-PDCCH) addressed to the group of UEs. In some aspects, the one or more repetitions of the broadcast message may be received in one or more transmission occasions, which may be contiguous or non-contiguous.

As further shown in FIG. 5, and by reference number 520, the UE may perform a decode attempt on the transport block carried in the broadcast message. For example, in some aspects, the UE may determine a HARQ configuration that indicates whether HARQ combining is supported for the broadcast message, and may perform the decode attempt on the transport block carried in the broadcast message based on the HARQ configuration. For example, reference number 530 depicts an example where the HARQ configuration indicates that HARQ combining (e.g., over multiple non-contiguous repetitions) is unsupported for the broadcast message, in which case the UE may perform the decode attempt on each repetition of the broadcast message individually. In such cases, when HARQ combining is not supported for the broadcast message and the decode attempt fails on a particular repetition of the broadcast message (e.g., when one or more errors occur), the UE may discard the data associated with the particular repetition that failed the decode attempt, and the UE may perform a new decode attempt on the next repetition of the broadcast message in the next time instance. Alternatively, when the decode attempt succeeds for a particular repetition of the broadcast message, the UE may further process the transport block carried therein as appropriate.

Alternatively, as shown by reference number 540, the HARQ configuration may indicate that HARQ combining is supported for the broadcast message, in which case the UE may combine one or more repetitions of the broadcast message in a soft buffer and perform the decode attempt on the transport block carried in the one or more repetitions of the broadcast message based on the data stored in the soft buffer. For example, when the decode attempt succeeds for a first repetition of the broadcast message, the UE may further process the transport block carried therein as appropriate. Otherwise, in cases where the decode attempt fails for a first (or subsequent) repetition of the broadcast message, the UE may store the data associated with the failed decode attempt in the appropriate soft buffer (e.g., together with data associated with any previous failed decoding attempts), which the UE may combine with data associated with a next repetition before performing another decode attempt based on the data stored in the soft buffer. In this case, as described above, the UE may need to associate different repetitions of the broadcast message with a HARQ process in order to store data associated with different repetitions in the same soft buffer. Accordingly, the UE may determine a HARQ process to associate with the broadcast message in order to determine the appropriate soft buffer in which to store the data associated with the repetition(s) of the broadcast message. For example, as described herein, the UE may be configured with up to sixteen (16) HARQ processes that can be used to enable HARQ combining for unicast or multicast transmissions, and the UE may be further configured with a dedicated HARQ process that can be used to enable HARQ combining for system information carried in a SIB. Accordingly, in cases where the HARQ configuration indicates that HARQ combining is supported for the broadcast message, the broadcast message may share the dedicated HARQ process with the SIB, or the UE may borrow one or more of the HARQ processes available for unicast or multicast service for the broadcast message. Alternatively, the UE may be configured with one or more additional dedicated HARQ process for broadcast services, and the HARQ process used for the broadcast message may be a dedicated HARQ process associated with HARQ combining for broadcast services.

In some aspects, in cases where the HARQ process used for the broadcast message is a dedicated HARQ process associated with HARQ combining for broadcast services, the UE may determine the dedicated HARQ process based on a mapping between the dedicated HARQ process and the G-RNTI to which the broadcast message is addressed. For example, in some aspects, the dedicated HARQ process(es) associated with HARQ combining for broadcast service may be associated with a 1:1 mapping between the dedicated HARQ process and a G-RNTI (e.g., where one dedicated HARQ process is associated with one G-RNTI), an N:1 mapping (e.g., where one or more dedicated HARQ processes are associated with the same G-RNTI), or a 1:N mapping (e.g., where one dedicated HARQ processes is associated with one or more G-RNTIs). In the case of a 1:1 mapping or a 1:N mapping, the UE may be able to unambiguously identify the dedicated HARQ process that is associated with a particular G-RNTI and thereby determine the soft buffer in which to store data from one or more repetitions of the broadcast message. However, in the case of an N:1 mapping, where one G-RNTI may be associated with different HARQ processes, the UE may be unable to unambiguously identify the dedicated HARQ process associated with a G-RNTI. Accordingly, in cases where there is an N:1 mapping between dedicated HARQ processes and G-RNTIs for broadcast service, the GC-PDCCH scheduling the broadcast message may indicate the dedicated HARQ process to use for HARQ combining for a broadcast message associated with a particular G-RNTI.

In some aspects, although using a dedicated HARQ process to support HARQ combining for broadcast service may improve performance for broadcast service, the dedicated HARQ process(es) for broadcast may increase the total number of HARQ processes at the UE, which may increase complexity at the UE and/or require greater storage and/or processing resources to handle the relatively large soft buffer that may be needed to store the combined data associated with the repetitions of the broadcast message. Accordingly, in some aspects, HARQ combining for broadcast services may be supported by sharing the dedicated HARQ process used to enable HARQ combining for system information carried in a SIB. In such cases, the broadcast message and the SIB that are sharing the same dedicated HARQ process may be associated with different scheduling windows. For example, in some aspects, the repetitions of the broadcast message may be transmitted in a first scheduling window and repetitions of the SIB may be transmitted in a second scheduling window that is non-overlapping with respect to the first scheduling window. In this way, the soft buffer associated with the (shared) dedicated HARQ process can be used to enable HARQ combining for the broadcast message during the first scheduling window before flushing the soft buffer and using the soft buffer to enable HARQ combining for the SIB during the second scheduling window, or vice versa.

In some aspects, although sharing one dedicated HARQ process to support HARQ combining for broadcast service and system information may avoid a need to increase the total number of HARQ processes at the UE, the dedicated HARQ process used for HARQ combining system information is typically associated with a soft buffer that has a small size. Accordingly, in some aspects, HARQ combining for broadcast services may be supported by borrowing one or more HARQ processes that are otherwise used to support HARQ combining for unicast or multicast service. In such cases, the base station may indicate how the UE is to split or otherwise assign the unicast or multicast HARQ processes among unicast service, multicast service, and broadcast service. Furthermore, in some aspects, the base station may provide the indication of how the unicast or multicast HARQ processes are to be assigned among unicast service, multicast service, and broadcast service based on the UE transmitting an indication to the base station to register interest in one or more broadcast services.

In this case, selecting the HARQ process for the broadcast message from the group of HARQ processes associated with unicast or multicast service may similarly avoid a need to increase the total number of HARQ processes at the UE in addition to providing a larger soft buffer size to support HARQ combining over the multiple non-contiguous repetitions of the broadcast message. However, borrowing one or more unicast or multicast HARQ processes to support HARQ combining for broadcast service may reduce the number of HARQ processes available to support HARQ combining for unicast or multicast service. In general, reducing the number of HARQ processes available to support HARQ combining for unicast or multicast service may not present a significant concern when the UE is in an RRC idle or inactive state, because the UE generally does not receive unicast or multicast transmissions in an RRC idle or inactive state. However, borrowing a unicast or multicast HARQ process may hamper unicast or multicast decoding performance when the UE is receiving unicast or multicast service in an RRC connected state.

Accordingly, as described above, different HARQ configurations for broadcast service may be associated with different tradeoffs. For example, when the HARQ configuration indicates that HARQ combining is not supported for broadcast, UE complexity is reduced (or at least not increased) because there is no need to increase resources to manage soft buffers to enable HARQ combining for the broadcast message. Furthermore, when HARQ combining is unsupported for broadcast, there may be no impact on HARQ combining for a SIB and/or unicast or multicast service. However, as described above, a lack of support for HARQ combining may degrade decoding performance for broadcast. Accordingly, the various techniques described above to enable HARQ combining may improve broadcast performance. However, the various techniques described above may be associated with different levels of UE complexity. For example, using a dedicated HARQ process for broadcast may increase the total number of HARQ processes, which results in increased complexity to handle the additional soft buffer(s); sharing the dedicated HARQ process for a SIB may be associated with a size limitation due to the small soft buffer size and scheduling complexity because broadcast transmissions and SIB transmissions need to be in different scheduling windows; and borrowing a unicast or multicast HARQ process may reduce the number of HARQ processes available when the UE is receiving unicast or multicast service in an RRC connected state.

Accordingly, in some aspects, the HARQ configuration that applies to a particular broadcast message may be based at least in part on one or more properties of the broadcast message, in order to improve broadcast performance without significantly increasing complexity associated with managing an additional large soft buffer, coordinating scheduling, and/or reducing the number of HARQ processes available for unicast or multicast service. For example, in some aspects, the one or more properties may include a multicast channel carrying the broadcast message. For example, the HARQ configuration may indicate that HARQ combining is not supported for a broadcast message carried on a traffic channel (e.g., an MBTCH or an MTCH), or may indicate that HARQ combining is supported for a broadcast message carried on a control channel (e.g., an MBCCH or an MCCH). In the latter case, where HARQ combining is supported for a broadcast message carried on a control channel, the base station may transmit a SIB that includes one or more parameters to indicate whether the UE is to use a dedicated HARQ process, share the dedicated HARQ process associated with the SIB, or borrow a unicast or multicast HARQ process to enable HARQ combining for the broadcast message carried on the control channel.

Additionally, or alternatively, the one or more properties may include a data rate and/or a QoS requirement associated with the broadcast message. For example, the HARQ configuration may indicate that HARQ combining is not supported for a broadcast message that has a high data rate or no QoS requirement, or the HARQ configuration may indicate that HARQ combining is supported for a broadcast message that has a low data rate (e.g., using quadrature phase-shift keying (QPSK) modulation) or a low QoS requirement. Alternatively, a dedicated HARQ process for broadcast may be used or a unicast or multicast HARQ process may be borrowed for a broadcast message that has a high data rate, and use of the dedicated HARQ process associated with the SIB may be limited to broadcast messages that have a low data rate and/or use QPSK modulation based on the smaller soft buffer size. In some aspects, whether HARQ combining is supported or unsupported (and/or the HARQ process management technique to be used when HARQ combining is supported) may be configured by a G-RNTI or TMGI associated with the broadcast service. For example, in some aspects, HARQ combining may be supported for a first set of G-RNTIs or TMGIs and unsupported for a second set of G-RNTIs or TMGIs.

Additionally, or alternatively, the one or more properties may include an RRC status associated with the UE. For example, in some aspects, the HARQ configuration may indicate that HARQ combining is supported when the UE is in an RRC idle or inactive state, and whether the UE is to use a dedicated HARQ process, share the dedicated HARQ process associated with the SIB, or borrow a unicast or multicast HARQ process may be predefined or configured in a SIB. In another example, the HARQ configuration may indicate that HARQ combining is not supported when the UE is in an RRC connected state, or the HARQ configuration may indicate that HARQ combining is supported when the UE is in the RRC connected state subject to the UE having a capability to support HARQ combining for broadcast in the RRC connected state.

Furthermore, it will be appreciated that whether the HARQ configuration enables HARQ combining for broadcast may be based on other properties and/or a combination of properties. For example, in some aspects, the HARQ configuration may indicate that HARQ combining is not supported when the UE is receiving broadcast data in an RRC connected state with a high data rate, and that HARQ combining is otherwise supported when the broadcast data received in the RRC connected state is not associated with a high data rate (e.g., the data rate fails to satisfy a threshold). In another example, an earlier version of a RAT (e.g., NR Release-17) may lack support for HARQ combining for broadcast, and support for HARQ combining for broadcast may be added to a later version of the RAT (e.g., NR Release-18). In this example, the HARQ configuration may indicate that HARQ combining is not supported for broadcast messages associated with the earlier version of the RAT and that HARQ combining is supported for broadcast messages associated with the later version(s) of the RAT.

In some aspects, whether HARQ combining can be performed for the broadcast message may be explicitly or implicitly indicated by a DCI message with a CRC scrambled by an RNTI associated with the broadcast message. For example, a DCI message with a CRC scrambled by an MCCH RNTI or an MTCH RNTI may indicate an HPID, an NDI, and an RV for the repetition. For the same HPID and the same RNTI, the NDI field in the DCI message can be toggled (e.g., changed from a 0 to a 1, or from a 1 to 0) to indicate a new transmission or a retransmission to the UE, and the RV can be used to indicate the encoded redundancy version for a retransmission. If the broadcast message is a retransmission with an indicated RV value, the UE may know whether soft combining can be performed with the previously received data in the soft buffer; otherwise if the broadcast message is a new transmission, the soft buffer can be cleared by deleting previously received data in the buffer. In some cases, the HPID and/or the NDI may not be indicated by the DCI message for the broadcast message. For the HARQ process allocation, in some examples, if broadcast repetitions are configured and only one HARQ process is allocated for soft combining, the HPID may not need to be explicitly indicated in the DCI message. In another example, if broadcast repetitions are configured and different HARQ processes are allocated for different broadcast messages identified by the associated RNTI, the HPID may not need to be explicitly indicated in the DCI and the UE can use the RNTI to differentiate the HARQ processes for soft combining. For new data scheduling, in one example, if a new transmission is only scheduled periodically based on a configured or predefined modification periodicity, the UE can know whether a broadcast message is a new transmission without the NDI indicated in the DCI message. In another example, a new transmission may be scheduled aperiodically and the NDI may be indicated in the DCI message to inform the UE when the broadcast message is a new transmission or a retransmission to perform soft combining. Although the above schemes can be used to indicate the HARQ combining, the UE is generally not required to apply soft combining of a broadcast message. Whether to soft combine different repetitions of a broadcast transmission can be based on UE implementation. Based on the properties of different broadcast messages, such as a broadcast control message carried in an MCCH addressed by an MCCH RNTI, or broadcast data packets carried in an MTCH addressed by different G-RNTIs, the repetition, the HARQ process allocation, and/or the new data transmission to support HARQ combining can be independently configured.

As indicated above, FIG. 5 is provided as an example. Other examples may differ from what is described with regard to FIG. 5.

Figure 6:
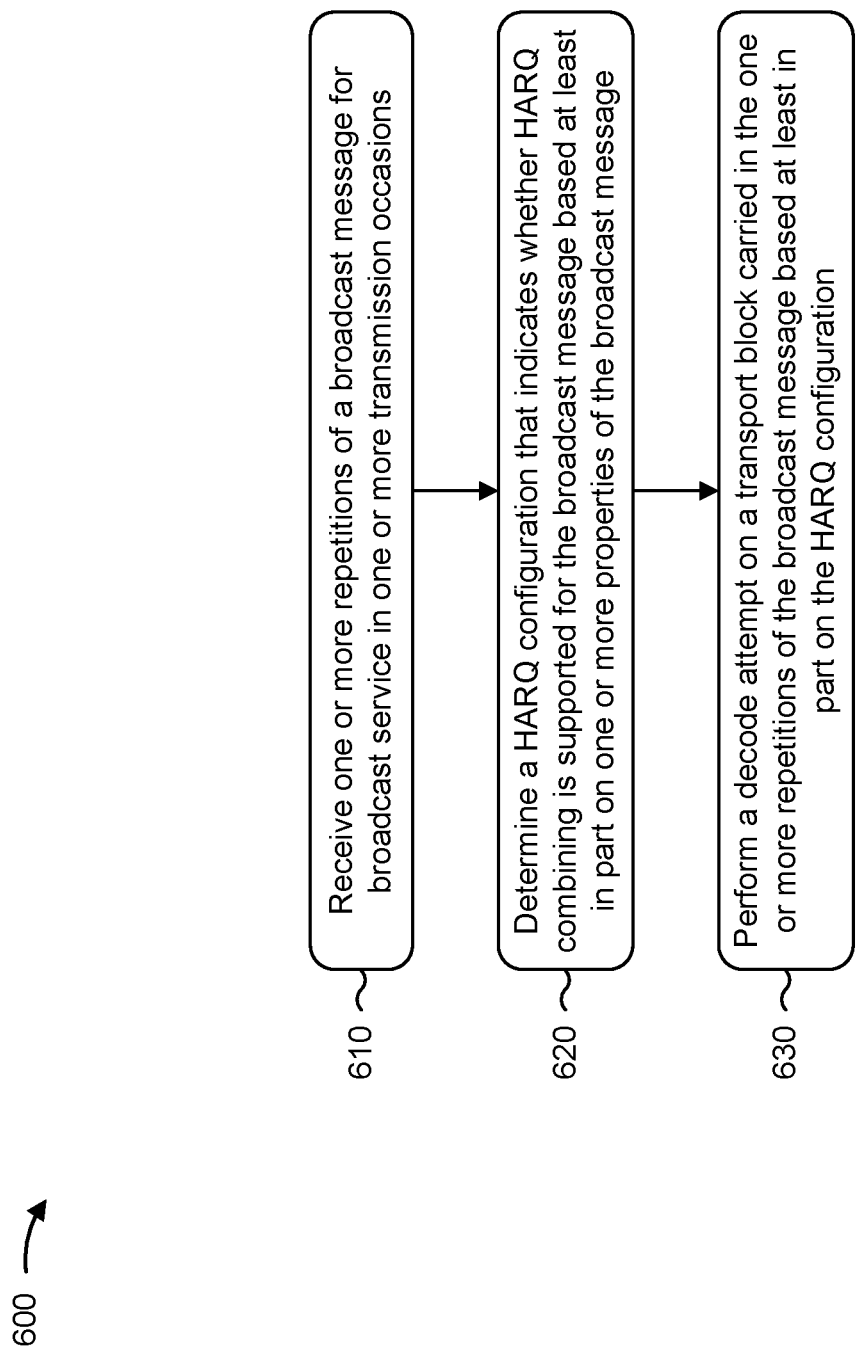
FIGS. 6-7 are diagrams illustrating example processes associated with HARQ process management for broadcast, in accordance with the present disclosure.

FIG. 6 is a diagram illustrating an example process 600 performed, for example, by a UE, in accordance with the present disclosure. Example process 600 is an example where the UE (e.g., UE 120) performs operations associated with HARQ process management for broadcast.

As shown in FIG. 6, in some aspects, process 600 may include receiving one or more repetitions of a broadcast message for broadcast service in one or more transmission occasions (block 610). For example, the UE (e.g., using communication manager 140 and/or reception component 802, depicted in FIG. 8) may receive one or more repetitions of a broadcast message for broadcast service in one or more transmission occasions, as described above.

As further shown in FIG. 6, in some aspects, process 600 may include determining a HARQ configuration that indicates whether HARQ combining is supported for the broadcast message based at least in part on one or more properties of the broadcast message (block 620). For example, the UE (e.g., using communication manager 140 and/or determination component 808, depicted in FIG. 8) may determine a HARQ configuration that indicates whether HARQ combining is supported for the broadcast message based at least in part on one or more properties of the broadcast message, as described above.

As further shown in FIG. 6, in some aspects, process 600 may include performing a decode attempt on a transport block carried in the one or more repetitions of the broadcast message based at least in part on the HARQ configuration (block 630). For example, the UE (e.g., using communication manager 140 and/or decoding component 810, depicted in FIG. 8) may perform a decode attempt on a transport block carried in the one or more repetitions of the broadcast message based at least in part on the HARQ configuration, as described above.

Process 600 may include additional aspects, such as any single aspect or any combination of aspects described below and/or in connection with one or more other processes described elsewhere herein.

In a first aspect, performing the decode attempt on the transport block carried in the one or more repetitions of the broadcast message includes performing the decode attempt on the transport block carried in individual transmission occasions based at least in part on the HARQ configuration indicating that HARQ combining is not supported for the broadcast message.

In a second aspect, alone or in combination with the first aspect, performing the decode attempt on the transport block carried in the one or more repetitions of the broadcast message includes combining the one or more repetitions of the broadcast message in a soft buffer associated with a HARQ process based at least in part on the HARQ configuration indicating that HARQ combining is supported for the broadcast message, and performing the decode attempt on the transport block based at least in part on data stored in the soft buffer associated with the HARQ process.

In a third aspect, alone or in combination with one or more of the first and second aspects, the HARQ process is a dedicated HARQ process associated with HARQ combining for broadcast service.

In a fourth aspect, alone or in combination with one or more of the first through third aspects, combining the one or more repetitions of the broadcast message includes determining the dedicated HARQ process based at least in part on a mapping between the dedicated HARQ process and a G-RNTI associated with the broadcast service.

In a fifth aspect, alone or in combination with one or more of the first through fourth aspects, process 600 includes receiving a GC-PDCCH that indicates one of multiple dedicated HARQ processes based at least in part on the G-RNTI associated with the broadcast message.

In a sixth aspect, alone or in combination with one or more of the first through fifth aspects, the HARQ process is a shared dedicated HARQ process associated with HARQ combining for broadcast service or data carried in a SIB.

In a seventh aspect, alone or in combination with one or more of the first through sixth aspects, the SIB is associated with a first scheduling window and the broadcast message is associated with a second scheduling window.

In an eighth aspect, alone or in combination with one or more of the first through seventh aspects, the HARQ process is selected from multiple HARQ processes associated with HARQ combining for unicast or multicast service.

In a ninth aspect, alone or in combination with one or more of the first through eighth aspects, process 600 includes receiving an indication assigning the multiple HARQ processes to one or more of unicast service, multicast service, or broadcast service, wherein the HARQ process is selected from the multiple HARQ processes based at least in part on the indication.

In a tenth aspect, alone or in combination with one or more of the first through ninth aspects, process 600 includes transmitting information to register interest in one or more broadcast services, and receiving an indication enabling selection of the HARQ process from the multiple HARQ processes based at least in part on the information to register interest in the one or more broadcast services.

In an eleventh aspect, alone or in combination with one or more of the first through tenth aspects, the one or more properties include a multicast channel carrying the broadcast message.

In a twelfth aspect, alone or in combination with one or more of the first through eleventh aspects, the one or more properties include a data rate or a QoS requirement associated with the broadcast service.

In a thirteenth aspect, alone or in combination with one or more of the first through twelfth aspects, the one or more properties include an RRC status associated with the UE.

In a fourteenth aspect, alone or in combination with one or more of the first through thirteenth aspects, the HARQ configuration indicates whether HARQ combining is supported for the broadcast message while the UE is in an RRC idle or inactive state.

In a fifteenth aspect, alone or in combination with one or more of the first through fourteenth aspects, the HARQ configuration indicates whether HARQ combining is supported for the broadcast message while the UE is in an RRC connected state based at least in part on a reported UE capability on HARQ combining.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
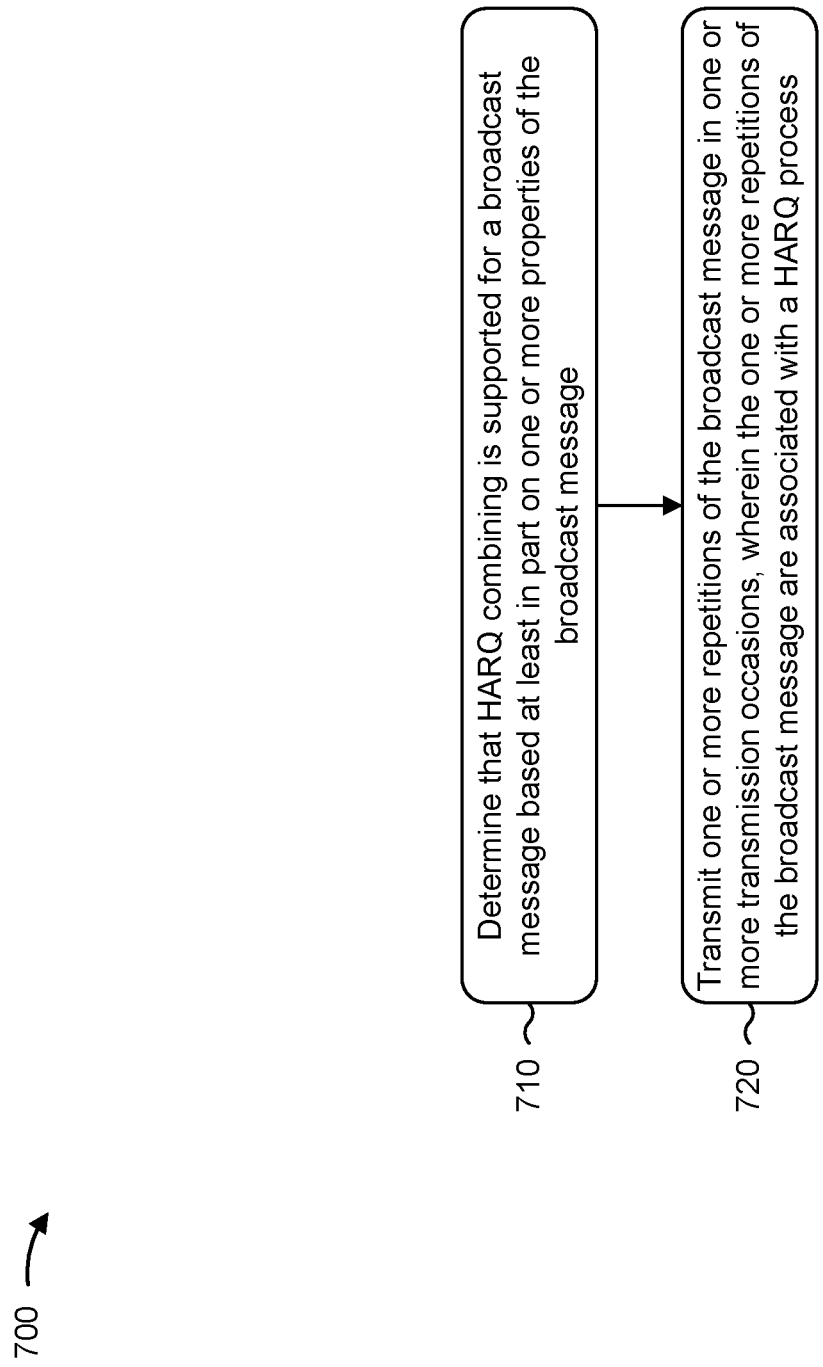

FIG. 7 is a diagram illustrating an example process 700 performed, for example, by a network node, in accordance with the present disclosure. Example process 700 is an example where the network node (e.g., base station 110) performs operations associated with HARQ process management for broadcast.

As shown in FIG. 7, in some aspects, process 700 may include determining that HARQ combining is supported for a broadcast message based at least in part on one or more properties of the broadcast message (block 710). For example, the network node (e.g., using communication manager 150 and/or determination component 908, depicted in FIG. 9) may determine that HARQ combining is supported for a broadcast message based at least in part on one or more properties of the broadcast message, as described above.

As further shown in FIG. 7, in some aspects, process 700 may include transmitting one or more repetitions of the broadcast message in one or more transmission occasions, wherein the one or more repetitions of the broadcast message are associated with a HARQ process (block 720). For example, the network node (e.g., using communication manager 150 and/or transmission component 904, depicted in FIG. 9) may transmit one or more repetitions of the broadcast message in one or more transmission occasions, wherein the one or more repetitions of the broadcast message are associated with a HARQ process, as described above.

Process 700 may include additional aspects, such as any single aspect or any combination of aspects described in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
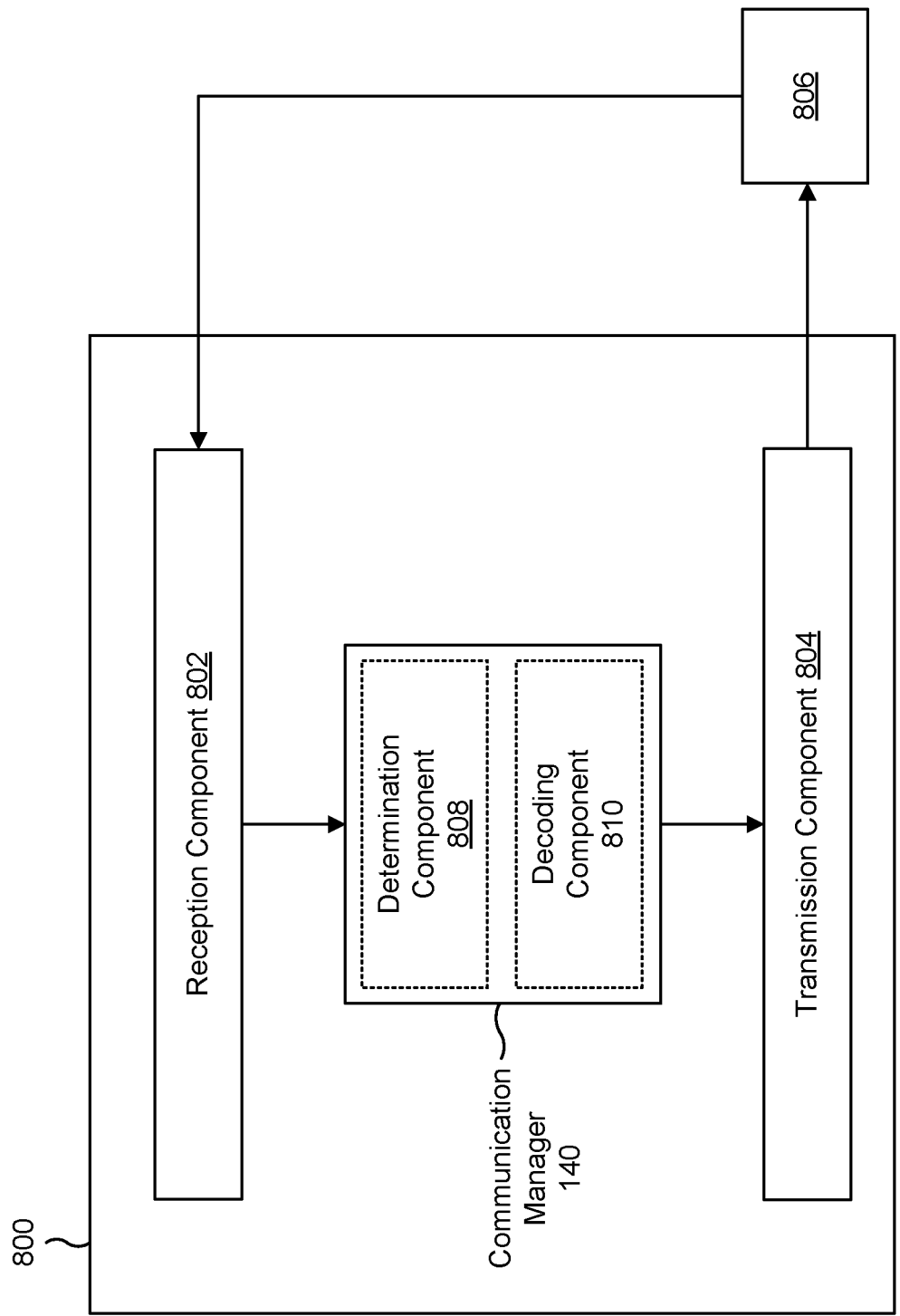
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808 or a decoding component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive one or more repetitions of a broadcast message for broadcast service in one or more transmission occasions. The determination component 808 may determine a HARQ configuration that indicates whether HARQ combining is supported for the broadcast message based at least in part on one or more properties of the broadcast message. The decoding component 810 may perform a decode attempt on a transport block carried in the one or more repetitions of the broadcast message based at least in part on the HARQ configuration.

The reception component 802 may receive a GC-PDCCH that indicates one of multiple dedicated HARQ processes based at least in part on the G-RNTI associated with the broadcast message.

The reception component 802 may receive an indication assigning the multiple HARQ processes to one or more of unicast service, multicast service, or broadcast service, wherein the HARQ process is selected from the multiple HARQ processes based at least in part on the indication.

The transmission component 804 may transmit information to register interest in one or more broadcast services. The reception component 802 may receive an indication enabling selection of the HARQ process from the multiple HARQ processes based at least in part on the information to register interest in the one or more broadcast services.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
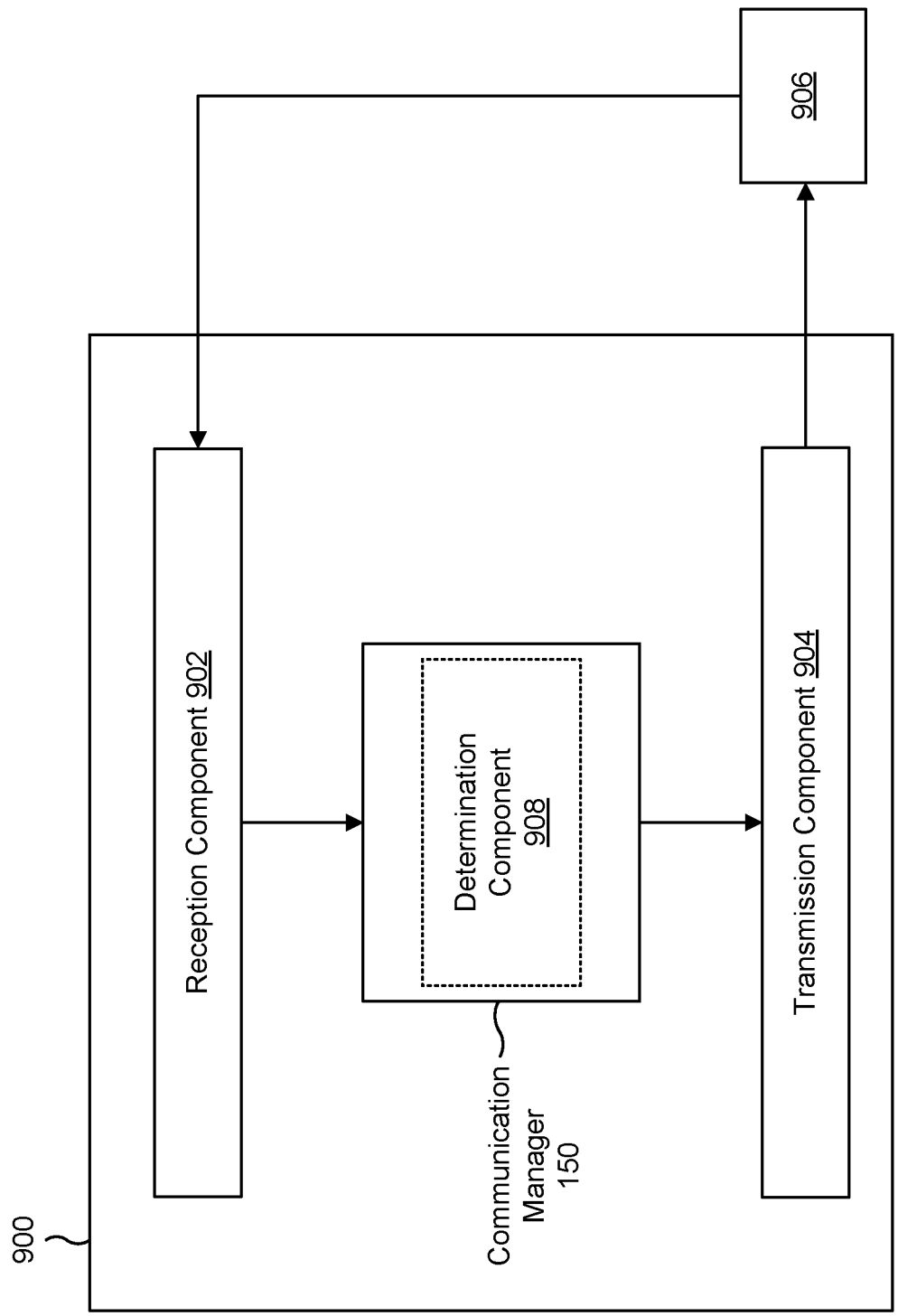

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The determination component 908 may determine that HARQ combining is supported for a broadcast message based at least in part on one or more properties of the broadcast message. The transmission component 904 may transmit one or more repetitions of the broadcast message in one or more transmission occasions, wherein the one or more repetitions of the broadcast message are associated with a HARQ process.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving one or more repetitions of a broadcast message for broadcast service in one or more transmission occasions; determining a HARQ configuration that indicates whether HARQ combining is supported for the broadcast message based at least in part on one or more properties of the broadcast message; and performing a decode attempt on a transport block carried in the one or more repetitions of the broadcast message based at least in part on the HARQ configuration.

Aspect 2: The method of Aspect 1, wherein performing the decode attempt on the transport block carried in the one or more repetitions of the broadcast message includes: performing the decode attempt on the transport block carried in individual transmission occasions based at least in part on the HARQ configuration indicating that HARQ combining is not supported for the broadcast message.

Aspect 3: The method of Aspect 1, wherein performing the decode attempt on the transport block carried in the one or more repetitions of the broadcast message includes: combining the one or more repetitions of the broadcast message in a soft buffer associated with a HARQ process based at least in part on the HARQ configuration indicating that HARQ combining is supported for the broadcast message; and performing the decode attempt on the transport block based at least in part on data stored in the soft buffer associated with the HARQ process.

Aspect 4: The method of Aspect 3, wherein the HARQ process is a dedicated HARQ process associated with HARQ combining for broadcast service.

Aspect 5: The method of Aspect 4, wherein combining the one or more repetitions of the broadcast message includes: determining the dedicated HARQ process based at least in part on a mapping between the dedicated HARQ process and a G-RNTI associated with the broadcast service.

Aspect 6: The method of Aspect 5, further comprising: receiving a GC-PDCCH that indicates one of multiple dedicated HARQ processes based at least in part on the G-RNTI associated with the broadcast message.

Aspect 7: The method of Aspect 3, wherein the HARQ process is a shared dedicated HARQ process associated with HARQ combining for broadcast service or data carried in a SIB.

Aspect 8: The method of Aspect 7, wherein the SIB is associated with a first scheduling window and the broadcast message is associated with a second scheduling window.

Aspect 9: The method of Aspect 3, wherein the HARQ process is selected from multiple HARQ processes associated with HARQ combining for unicast or multicast service.

Aspect 10: The method of Aspect 9, further comprising: receiving an indication assigning the multiple HARQ processes to one or more of unicast service, multicast service, or broadcast service, wherein the HARQ process is selected from the multiple HARQ processes based at least in part on the indication.

Aspect 11: The method of any of Aspects 9-10, further comprising: transmitting information to register interest in one or more broadcast services; and receiving an indication enabling selection of the HARQ process from the multiple HARQ processes based at least in part on the information to register interest in the one or more broadcast services.

Aspect 12: The method of any of Aspects 1-11, wherein the one or more properties include a multicast channel carrying the broadcast message.

Aspect 13: The method of any of Aspects 1-12, wherein the one or more properties include a data rate or a QoS requirement associated with the broadcast service.

Aspect 14: The method of any of Aspects 1-13, wherein the one or more properties include an RRC status associated with the UE.

Aspect 15: The method of Aspect 14, wherein the HARQ configuration indicates whether HARQ combining is supported for the broadcast message while the UE is in an RRC idle or inactive state.

Aspect 16: The method of Aspect 14, wherein the HARQ configuration indicates whether HARQ combining is supported for the broadcast message while the UE is in an RRC connected state based at least in part on a reported UE capability on HARQ combining.

Aspect 17: An apparatus for wireless communication at a device, comprising a processor; memory coupled with the processor; and instructions stored in the memory and executable by the processor to cause the apparatus to perform the method of any of Aspects 1-16.

Aspect 18: A device for wireless communication, comprising a memory and one or more processors coupled to the memory, the memory and the one or more processors configured to perform the method of any of Aspects 1-16.

Aspect 19: An apparatus for wireless communication, comprising at least one means for performing the method of any of Aspects 1-16.

Aspect 20: A non-transitory computer-readable medium storing code for wireless communication, the code comprising instructions executable by a processor to perform the method of any of Aspects 1-16.

Aspect 21: A non-transitory computer-readable medium storing a set of instructions for wireless communication, the set of instructions comprising one or more instructions that, when executed by one or more processors of a device, cause the device to perform the method of any of Aspects 1-16.

Aspect 22: A method of wireless communication performed by a network node, comprising: determining that HARQ combining is supported for a broadcast message based at least in part on one or more properties of the broadcast message; and transmitting one or more repetitions of the broadcast message in one or more transmission occasions, wherein the one or more repetitions of the broadcast message are associated with a HARQ process.

Aspect 23: An apparatus for wireless communication at a device, comprising a processor; memory coupled with the processor; and instructions stored in the memory and executable by the processor to cause the apparatus to perform the method of Aspect 22.

Aspect 24: A device for wireless communication, comprising a memory and one or more processors coupled to the memory, the memory and the one or more processors configured to perform the method of Aspect 22.

Aspect 25: An apparatus for wireless communication, comprising at least one means for performing the method of Aspect 22.

Aspect 26: A non-transitory computer-readable medium storing code for wireless communication, the code comprising instructions executable by a processor to perform the method of Aspect 22.

Aspect 27: A non-transitory computer-readable medium storing a set of instructions for wireless communication, the set of instructions comprising one or more instructions that, when executed by one or more processors of a device, cause the device to perform the method of Aspect 22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive one or more repetitions of a broadcast message for broadcast service in one or more transmission occasions;
determine a hybrid automatic repeat request (HARQ) configuration that indicates whether HARQ combining is supported for the broadcast message based at least in part on one or more properties of the broadcast message;

combine, using one or more HARQ processes, the one or more repetitions of the broadcast message based at least in part on the HARQ configuration indicating that HARQ combining is supported for the broadcast message,
wherein the one or more HARQ processes are associated with supporting HARQ combining for unicast or multicast service; and
perform a decode attempt on a transport block carried in the one or more repetitions of the broadcast message based at least in part on the HARQ configuration.

2. The UE of claim 1, wherein the one or more processors, to perform the decode attempt on the transport block carried in the one or more repetitions of the broadcast message, are configured to:
perform the decode attempt on the transport block carried in individual transmission occasions based at least in part on the HARQ configuration indicating that HARQ combining is not supported for the broadcast message.

3. The UE of claim 1, wherein the one or more processors are further configured to:
combine the one or more repetitions of the broadcast message in a soft buffer associated with a HARQ process based at least in part on the HARQ configuration indicating that HARQ combining is supported for the broadcast message; and
wherein the one or more processors, to perform the decode attempt on the transport block, are configured to:
perform the decode attempt on the transport block based at least in part on data stored in the soft buffer associated with the HARQ process.

4. The UE of claim 3, wherein the HARQ process is a dedicated HARQ process associated with HARQ combining for broadcast service.

5. The UE of claim 4, wherein the one or more processors, to combine the one or more repetitions of the broadcast message in the soft buffer, are configured to:
determine the dedicated HARQ process based at least in part on a mapping between the dedicated HARQ process and a group common radio network temporary identity (G-RNTI) associated with broadcast service.

6. The UE of claim 5, wherein the one or more processors are further configured to:
receive a group common physical downlink control channel that indicates one of multiple dedicated HARQ processes based at least in part on the G-RNTI associated with the broadcast message.

7. The UE of claim 3, wherein the HARQ process is a shared dedicated HARQ process associated with HARQ combining for broadcast service or data carried in a system information block (SIB).

8. The UE of claim 3, wherein the HARQ process is selected from the one or more HARQ processes associated with supporting HARQ combining for unicast or multicast service.

9. The UE of claim 8, wherein the one or more processors are further configured to:
receive an indication assigning the one or more HARQ processes, associated with supporting HARQ combining for unicast or multicast service, to one or more of unicast service, multicast service, or broadcast service,
wherein the HARQ process is selected from the one or more HARQ processes, associated with supporting HARQ combining for unicast or multicast service, based at least in part on the indication.

10. The UE of claim 8, wherein the one or more processors are further configured to:
transmit information to register interest in one or more broadcast services; and
receive an indication enabling selection of the HARQ process from the one or more HARQ processes, associated with supporting HARQ combining for unicast or multicast service, based at least in part on the information to register interest in the one or more broadcast services.

11. The UE of claim 1, wherein the one or more properties include a multicast channel carrying the broadcast message.

12. The UE of claim 1, wherein the one or more properties include a data rate or a quality of service requirement associated with broadcast service.

13. The UE of claim 1, wherein the one or more properties include a radio resource control (RRC) status associated with the UE.

14. The UE of claim 13, wherein the HARQ configuration indicates whether HARQ combining is supported for the broadcast message while the UE is in an RRC idle or inactive state.

15. The UE of claim 13, wherein the HARQ configuration indicates whether HARQ combining is supported for the broadcast message while the UE is in an RRC connected state based at least in part on a reported UE capability on HARQ combining.

16. A method of wireless communication performed by a user equipment (UE), comprising:
receiving one or more repetitions of a broadcast message for broadcast service in one or more transmission occasions;
determining a hybrid automatic repeat request (HARQ) configuration that indicates whether HARQ combining is supported for the broadcast message based at least in part on one or more properties of the broadcast message;
combining, using one or more HARQ processes, the one or more repetitions of the broadcast message when the HARQ configuration indicates that HARQ combining is supported for the broadcast message,
wherein the one or more HARQ processes are associated with supporting HARQ combining for unicast or multicast service; and
performing a decode attempt on a transport block carried in the one or more repetitions of the broadcast message based at least in part on the HARQ configuration.

17. The method of claim 16, wherein performing the decode attempt on the transport block carried in the one or more repetitions of the broadcast message comprises:
performing the decode attempt on the transport block carried in individual transmission occasions when the HARQ configuration indicates that HARQ combining is not supported for the broadcast message.

18. The method of claim 16, further comprising:
combining the one or more repetitions of the broadcast message in a soft buffer associated with a HARQ process based at least in part on the HARQ configuration indicating that HARQ combining is supported for the broadcast message; and
wherein performing the decode attempt on the transport block comprises:
performing the decode attempt on the transport block based at least in part on data stored in the soft buffer associated with the HARQ process.

19. The method of claim 18, wherein the HARQ process is a dedicated HARQ process associated with HARQ combining for broadcast service.

20. The method of claim 19, wherein combining the one or more repetitions of the broadcast message in the soft buffer comprises:
determining the dedicated HARQ process based at least in part on a mapping between the dedicated HARQ process and a group common radio network temporary identity (G-RNTI) associated with broadcast service.

21. The method of claim 20, further comprising:
receiving a group common physical downlink control channel that indicates one of multiple dedicated HARQ processes based at least in part on the G-RNTI associated with the broadcast message.

22. The method of claim 18, wherein the HARQ process is a shared dedicated HARQ process associated with HARQ combining for broadcast service or data carried in a system information block (SIB).

23. The method of claim 16, wherein combining the one or more repetitions of the broadcast message comprises:
combining the one or more repetitions of the broadcast message in a soft buffer associated with a HARQ process when the HARQ configuration indicates that HARQ combining is supported for the broadcast message,
wherein the HARQ process is selected from the one or more HARQ processes associated with supporting HARQ combining for unicast or multicast service.

24. The method of claim 23, further comprising:
receiving an indication assigning the one or more HARQ processes, associated with supporting HARQ combining for unicast or multicast service, to one or more of unicast service, multicast service, or broadcast service,
wherein the HARQ process is selected from the one or more HARQ processes, associated with supporting HARQ combining for unicast or multicast service, based at least in part on the indication.

25. The method of claim 23, further comprising:
transmitting information to register interest in one or more broadcast services; and
receiving an indication enabling selection of the HARQ process from the one or more HARQ processes, associated with supporting HARQ combining for unicast or multicast service, based at least in part on the information to register interest in the one or more broadcast services.

26. The method of claim 16, wherein the one or more properties include a multicast channel carrying the broadcast message.

27. The method of claim 16, wherein the one or more properties include a data rate or a quality of service requirement associated with the broadcast message.

28. The method of claim 16, wherein the one or more properties include a radio resource control (RRC) status associated with the UE.

29. A non-transitory computer-readable medium storing a set of instructions for wireless communication, the set of instructions comprising:
one or more instructions that, when executed by one or more processors of a user equipment (UE), cause the UE to:
receive one or more repetitions of a broadcast message for broadcast service in one or more transmission occasions;
determine a hybrid automatic repeat request (HARQ) configuration that indicates whether HARQ combining is supported for the broadcast message based at least in part on one or more properties of the broadcast message;
combine, using one or more HARQ processes, the one or more repetitions of the broadcast message based at least in part on the HARQ configuration indicating that HARQ combining is supported for the broadcast message,
wherein the one or more HARQ processes are associated with supporting HARQ combining for unicast or multicast service; and
perform a decode attempt on a transport block carried in the one or more repetitions of the broadcast message based at least in part on the HARQ configuration.

30. An apparatus for wireless communication, comprising:
means for receiving one or more repetitions of a broadcast message for broadcast service in one or more transmission occasions;
means for determining a hybrid automatic repeat request (HARQ) configuration that indicates whether HARQ combining is supported for the broadcast message based at least in part on one or more properties of the broadcast message;
means for combining, using one or more HARQ processes, the one or more repetitions of the broadcast message based at least in part on the HARQ configuration indicating that HARQ combining is supported for the broadcast message,
wherein the one or more HARQ processes are associated with supporting HARQ combining for unicast or multicast service; and
means for performing a decode attempt on a transport block carried in the one or more repetitions of the broadcast message based at least in part on the HARQ configuration.

* * * * *